US006671232B1

(12) United States Patent
Stupp (10) Patent No.: US 6,671,232 B1
(45) Date of Patent: Dec. 30, 2003

(54) METHOD AND APPARATUS FOR MEASURING THE SURFACE TEMPERATURE OF A DISK (75) Inventor: Steven E. Stupp, Los Altos, CA (US)

(73) Assignee: Maxtor Corporation, Longmont, CO (US)

( * ) Notice: Subject to any disclaimer, the term of this patent is extended or adjusted under 35 U.S.C. 154(b) by 303 days.

(21) Appl. No.: 09/916,134

(22) Filed: Jul. 25, 2001

(51) Int. Cl.[7] ............................................. G11B 11/00
(52) U.S. Cl. .................... 369/13.02; 369/13.26
(58) Field of Search .................. 369/13.02, 13.01, 369/13.56, 53.2, 53.41, 13.26, 13.25; 360/59, 75, 66, 137; 374/45, 18, 20, 29, 163

(56) References Cited

U.S. PATENT DOCUMENTS

| 4,122,505 | A | * | 10/1978 | Kuijk ......................... 360/66 |
| 4,858,220 | A | * | 8/1989 | Funada ...................... 369/116 |
| 4,908,835 | A | * | 3/1990 | Nishiuchi et al. ............. 374/45 |
| 5,182,742 | A | * | 1/1993 | Ohmori et al. ............. 369/116 |
| 5,329,512 | A | * | 7/1994 | Fukimoto et al. ........... 369/121 |
| 5,455,730 | A |   | 10/1995 | Dovek et al. |
| 5,461,603 | A | * | 10/1995 | Otsuka ...................... 369/53.18 |
| 5,751,510 | A | * | 5/1998 | Smith et al. ................... 360/67 |
| 6,088,176 | A | * | 7/2000 | Smith et al. ................... 360/46 |
| 6,195,219 | B1 | * | 2/2001 | Smith ........................... 360/66 |
| 6,239,936 | B1 | * | 5/2001 | Abraham et al. ............. 360/75 |
| 6,384,994 | B1 | * | 5/2002 | Smith et al. ................... 360/25 |
| 6,392,841 | B1 | * | 5/2002 | Ottesen et al. ............. 360/137 |
| 6,417,981 | B1 | * | 7/2002 | Smith ........................... 360/75 |

FOREIGN PATENT DOCUMENTS

EP 0-452-141 A2 * 11/1991

* cited by examiner

Primary Examiner—Tan Dinh (57) ABSTRACT

A technique for determining the recording medium temperature, thereby enabling high track density in Hybrid recording. This allows compensation for changes in the ambient temperature and variations in the laser power over its life. Such a temperature measuring technique also enables laser power shaping of the spot size/thermal contour in the medium, providing smaller spot size definition with a given optical system. Baseline modulation is a sensitive probe of the temperature gradient between a magneto-resistive read element (anisotropic or giant) and the surface of a disk. By calibrating the temperature rise (above ambient) of the read element, this technique can be used to determine the disk surface temperature.

55 Claims, 4 Drawing Sheets

METHOD AND APPARATUS FOR MEASURING THE SURFACE TEMPERATURE OF A DISK

FIELD OF THE INVENTION

The present invention relates to quality of recording in information storage devices such as disk drives, and in particular, to measuring the surface temperature of the storage medium, typically a disk, for high areal density recording.

BACKGROUND OF THE INVENTION

With increasing demand for data storage there is a corresponding demand for increasing recording density on storage media such as magnetic disk drives. Heads with an integrated inductive writer and a magneto-resistive (MR) reader are utilized in many disk drives for recording and reading data in concentric tracks on a data disk coated with a magnetic medium. The recording density on such disk is a function of the bits-per-inch (BPI) and tracks-per-inch (TPI) density of the recorded data.

As the recording density is increased the size of the magnetic grains in the medium is reduced. The smaller grains can become thermally unstable, wherein the magnetization direction spontaneously reverses due to thermal energy at finite temperature. In that process, the stored information is lost. Attempting to prevent this effect by increasing the medium anisotropy and coercivity, which improves the thermal stability of the magnetic grains, is problematic because it is difficult to generate sufficient magnetic field with the writer to record on such media.

Hybrid recording represents a potential solution to this problem. Hybrid recording uses a laser and magnetic field to write, and a magneto-resistive read transducer with or without a laser to read. In the former case, the laser elevates the medium temperature, thereby lowering the medium anisotropy and coercivity sufficiently such that the write element can reverse the medium magnetization and record information. As the medium cools, the anisotropy and coercivity increase, thereby improving the thermal stability in long-term storage.

Certain versions of Hybrid recording also use a laser in the read process. The laser is used to increase the temperature of the magnetic material in the medium. This material can be a ferri-magnet, which has at least two magnetic sub-lattices arranged such that the net magnetization is zero at a particular temperature. Changing the temperature increases the magnetization of a readout layer, such that a particular track can be read back (neighboring tracks are at lower temperatures and thus the read back signal is significantly smaller). Current Magneto-Optic recording uses the thermal profile in the storage medium to define the location of reversals in the medium magnetization direction (transitions), and the track width (in the write and/or read process). Hybrid recording can use the thermal profile, the magnetic field profile (of the fields produced by the recording head), or both, to define the transition locations and track width.

The thermal profile in the medium is a function of the thermal properties of the medium, the laser spot size and shape, the laser power and the ambient drive temperature. For a given medium and optical system, the effective write width is a sensitive function of the thermal profile in the cross-track direction. In that case, changes in the peak temperature in the medium leads to significant changes in the write width and, therefore, the track density.

To achieve a high track density (small write and read widths) in a Hybrid recording process, it is important to determine and control the thermal profile in the medium. Possible techniques include using the ratio of the Stokes/Anti-stokes intensity of a particular Raman mode associated with the overcoat or optical pyrometry, where the disk surface temperature is determined by infra-red radiation absorbed by a detector. However, such techniques are complex and require additional optical components, which make them expensive and difficult to implement in a practical storage device.

There is, therefore, a need for a simple method for determining the medium temperature in Hybrid recording to enable high track density. Furthermore, there is also a need for such a method to allow compensation for changes in the ambient temperature and variations in the laser power over its life. There is also a need for such a temperature measuring method to enable laser power shaping of the spot size/thermal contour in the medium (allowing smaller spot sizes to be defined with a given optical system).

BRIEF SUMMARY OF THE INVENTION

The present invention satisfies these needs. In one embodiment, the present invention provides a technique to determine the recording medium temperature, thereby enabling high track density in Hybrid recording. This allows compensation for changes in the ambient temperature and variations in the laser power over its life. Such a temperature measuring technique also enables laser power shaping of the spot size/thermal contour in the medium, providing smaller spot size definition with a given optical system. Baseline modulation is a sensitive probe of the temperature gradient between a magneto-resistive read element (anisotropic or giant) and the surface of a disk. By calibrating the temperature rise (above ambient) of the read element, this technique can be used to determine the disk surface temperature. This information is useful in high areal density Hybrid or conventional Magneto-Optic recording applications.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

In embodiment, the present invention provides a technique to determine the recording medium temperature, thereby enabling high track density in Hybrid recording. This allows compensation for changes in the ambient temperature and variations in the laser power over its life. Such a temperature measuring technique also enables laser power shaping of the spot size/thermal contour in the medium, providing smaller spot size definition with a given optical system.

Baseline modulation is a sensitive probe of the temperature gradient between a magneto-resistive read element (e.g., anisotropic or giant) and the surface of a disk. By calibrating the temperature rise (above ambient) of the read element, baseline modulation is used to determine the disk surface temperature. The information can be used in high areal density Hybrid or conventional Magneto-Optic recording applications.

Figure 1:
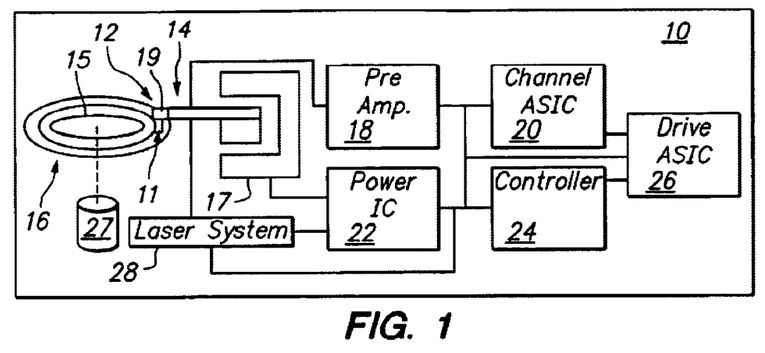
FIG. 1 shows an example embodiment of a disk drive in which the present invention can be implemented.

FIG. 1 shows an example embodiment of a disk drive 10 in which the present invention can be implemented. The disk drive 10 comprises a slider 19, with a head structure 12 including one or more magneto-resistive read transducer 11 moved by a support arm of an actuator assembly 14 via a VCM 17 across tracks 15 of one or more disks 16 rotated by a spindle motor 27 for data storage and data retrieval, and tracking to maintain the head 12 over a target position. The disk drive 10 further includes a preamplifier 18 for amplifying the read and write signals from and to the head 12, respectively, and a channel controller (ASIC) 20 for processing these signals and encoding and decoding data between user information and data written on disks 16. The channel ASIC 20 also decodes servo track number and converts servo burst amplitudes into digital values. The disk drive 10 further includes a power driver circuit (IC) 22 for driving the actuator 14 and the spindle motor 27 for rotating the disks 16, and a microcontroller (e.g. microprocessor) 24 and drive controller (ASIC) 26 for general control of the components of the disk drive 10 and interface to a host system.

Further the disk drive 10 includes a laser system 28 (FIG. 1). In one embodiment, laser light can be brought to the medium surface 30 of disks 16 (FIG. 2), via several means known in the art. For example, one side of the disk 16 can be illuminated with laser light, which passes through an optically transparent substrate before being absorbed by the magnetic layer on the surface 30 of disk 16 on the other side of disk 16, where it raises that layer's temperature. This technique is used in existing Magneto-Optical recording drives. Alternatively, laser light can pass through an optical fiber mounted on the actuator arm 14, and pass through the head 12 to the disk surface 30 via an optical waveguide. Other embodiments are possible.

Figure 2:
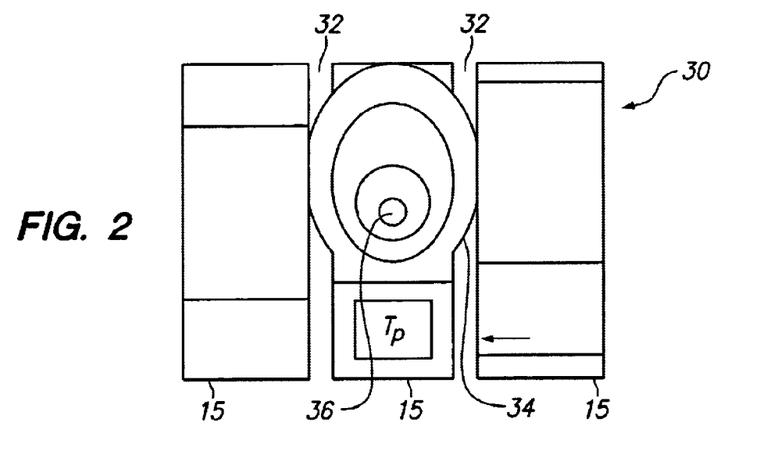
FIG. 2 shows an example schematic of three adjacent tracks (viewed from above) in a Hybrid recording system, illustrating thermal contours.

A Hybrid recording write process is illustrated in FIG. 2, showing a portion of the surface medium 30 of a disk 16 viewed from above, including three adjacent tracks 15 separated by erase bands 32, and thermal contours 34 on the central track where a bit is being written in the center 36 of the concentric contours 34, at a track pitch Tp. In one example, the track pitch is defined as a track 15 and half of the erase band 32 on each side of the track 15.

Figure 3:
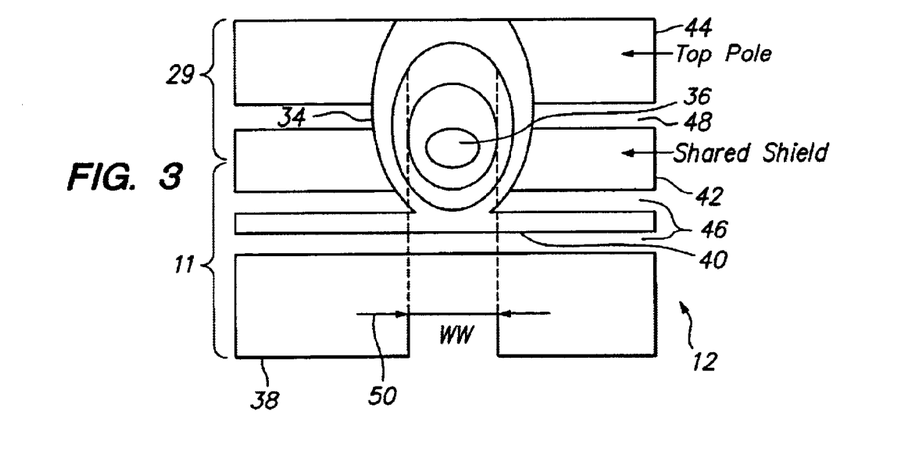
FIG. 3 shows an example schematic of the write width WW defined by the thermal profile in the medium in the cross-track direction in Hybrid recording.

FIG. 3 illustrates the Hybrid write process (viewed from below) with the thermal contours 34 in the medium 30 superimposed on the air bearing surface of the head 12. The head 12 includes a bottom shield 38, MR read element 40, shared shield 42 and top pole 44, wherein the MR read element 40 is separated from the bottom shield 38 and the shared shield 42 by read gaps 46, and the shared shield 42 is separated from the top pole 44 by a write gap 48. The shared shield 42, the top pole 44, and the write gap 48 form an integrated thin-film writer 29 in the head 12, and the bottom shield 38, the read gaps 46, the MR read element 40 and the shared shield 42 comprise the magneto-resistive read transducer 11. A bit is being written at spot 36 by the head 12.

In this embodiment of the head 12, the top pole 44 is as large as the shared shield 42, wherein the laser spot 36 is centered on the shared shield 42. The write width 50 (WW) is defined by the thermal profile in the medium in the cross-track direction (not by photolithorgraphically defining a narrow top pole). By heating the medium 30 using a laser spot from the later system 28, at the center 36 of the contours 34, the coercivity of the magnetic medium 30 changes (coercivity is a measure of the magnetic field required to reverse magnetization of the medium 30). In the center 36 of the thermal contour 34 where the coercivity in the medium 30 is at an elevated temperature equal to the head field, the write width 50 (WW) is defined such that one of the contours 34 corresponds to the write width 50, as shown. By changing the power in the laser 28, and therefore the heat diffusion in the medium 30, the spatial location of the thermal contours 34 changes, resulting in a change in write width 50, and the track width and TPI.

In the example head 12 shown in FIG. 3, the head structure is formed by a series of layers deposited on the back of a slider 19 on the actuator arm (diagrammatically shown in FIG. 1), wherein as the disk 16 rotates, the slider 19 glides (flies) on an air layer between the disk surface 30 and the slider 19, maintaining a distance or flying height (FH) between the head 12 and the disk surface. Typically, in a head 12, the top pole 44 is lithographically defined to look like a keystone, however, in FIG. 3 the top pole 44 co-extends with the shared shield 42, because according to an aspect of the present invention, rather than lithographically defining a very narrow keystone shaped top pole, the top pole 44 can be as wide as the intermediate shared shield 42, and a track width is defined by the thermal contours in the medium 34, thus by the laser power. The write Width 50 is defined by the heating of the medium 30, such as by the laser spot 36.

Figure 4:
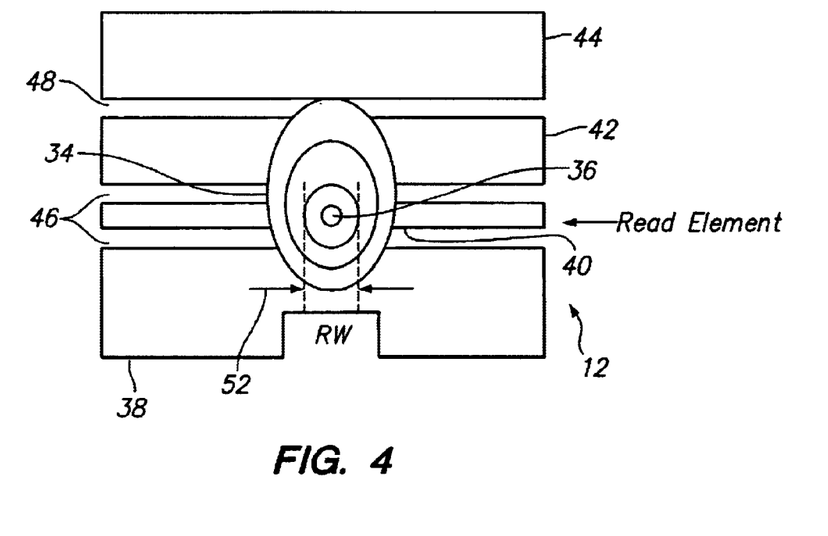
FIG. 4 shows an example schematic of read width RW defined by the thermal profile in the medium in the cross-track direction in a variation on Hybrid recording.

FIG. 4 illustrates a variation on the Hybrid recording read process (viewed from below), with the thermal contours 34 in the medium 30 superimposed on the air bearing surface of the MR reads element 40 of the head 12. The MR read element 40 is wider than the thermal contours 34, wherein the read width (RW) 52 is determined by the thermal profile in the medium in the cross-track direction.

The change in medium coercivity as a function of temperature can be used in the write process, e.g. by lowering coercivity, and in the read process. In the class of magnetic materials whose magnetic properties are a strong function of temperature (ferri-magnets), some of these materials have a net magnetization of zero at, e.g., room temperature. However, there is a net magnetization at elevated temperatures. Therefore, at room temperature there is zero net magnetization in the medium 30, which is preferable good for thermal stability. Then turning the laser 28 on heats up the track 15 (turns the track on), and the track 15 has a net magnetization that is non-zero, and that magnetization is read back by the magneto-resistive read transducer 11, which includes the MR read element 40. Depending on the laser power on readback, the size of the track 15 that was turned on can be adjusted, thereby adjusting the read width (RW) 52.

Figure 5:
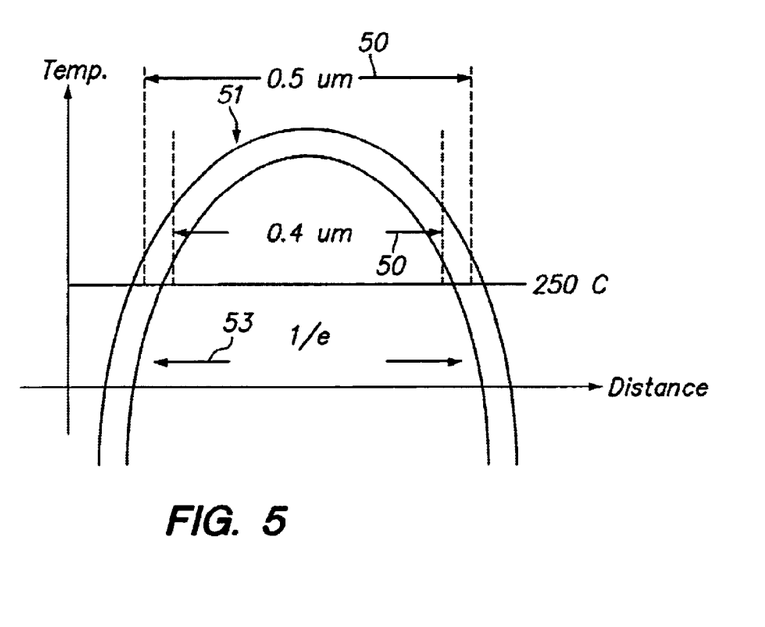
FIG. 5 shows an example graph of how variations in the thermal profile in the medium in the cross-track direction affect the track width.

The thermal profile in the medium 30 is a function of the thermal properties of the medium 30, the laser spot 36 size and shape, the laser power and the ambient drive temperature. FIG. 5 shows an example thermal profile 51 of the medium 30 surface temperature (vertical axis) vs distance (horizontal axis) in the vicinity of the laser spot 36, in the cross-track direction, wherein the disk surface temperature varies with off-track position. As illustrated in FIG. 5, for a given medium 30 and optical/laser system 28 (FIG. 1) in the disk drive 10, the effective write width 50 (e.g., the full-width-at-half-maximum in FIG. 5), is a sensitive function of the thermal profile 51 in the cross-track direction. Changes in the peak temperature in the medium 30 lead to significant changes in the write width 50. In the example of FIG. 5, at 250 C medium temperature, the coercivity is proper for defining the write width 50 based on the magnetic fields coming out of the write thin film writer 29. For a laser power and temperature profile in the cross-track direction, a particular value of the write width 50 is provided to be e.g. 0.4 micrometers. If laser power changes in time, or ambient temperature changes, then there is a different temperature profile 51, wherein location of the cross-track direction where the medium temperature is 250 C is different, and a different write width 50 is provided to be e.g. 0.5 micrometers. There can be a distribution of laser power around the laser spot 36, wherein the laser power in a cross-track profile is substantially Gaussian. Typically in optics, an effective width of the laser is defined by the intensity profile, and a common measure is the 1/e distance 53, indicating the laser intensity is down by a factor of 1/e from the maximum.

In the description herein, the track pitch is 1/TPI, and track width is a generic term for the WW 50 or the RW 52. The WW 50 and RW 52 are smaller than the track pitch to ensure that neighboring tracks are not over written, or read during the write and read processes, respectively. The value of the WW 50 can be about e.g. 0.8 times the track pitch and the value of the RW 52 can be about e.g. 0.55 times the track pitch.

A sense current $I_S$ driven through a magneto-resistive read element 40 (e.g., anisotropic or giant), gives rise to Joule heating. As shown by example in FIG. 6, the elevated temperature of the magneto-resistive read element 40 implies a thermal gradient between the magneto-resistive read element 40 and its immediate surroundings, such as the head shields 38 and 42 and the disk surface 16. As such, there is heat transfer (Qhs) between the magneto-resistive read element 40 and the shields 38 and 42, and there is heat transfer (Qhd) between the magneto-resistive read element 40 and the disk surface 16.

Figure 6:
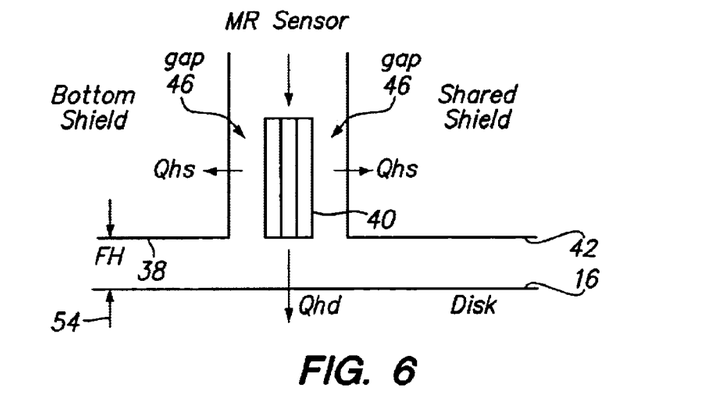
FIG. 6 shows a side view of the head/disk interface illustrating the heat transfer from the MR sensor to the shields (Qhs) and disk (Qhd)

For flying heights (FH) 54 lower than e.g. 4 microinches (100 nm), the heat transfer between the magneto-resistive read element 40 and the surface 30 of the disk 16 is ballistic, wherein the mean free path of the air molecules is larger than the flying height. As such, a change in the flying height (FH) 54 leads to a change in the thermal impedance, and thus the heat transfer between the read element 40 and the disk surface 30. The change in the heat transfer leads to a change in the temperature T of the magneto-resistive read element 40. Because the magneto-resistive read element 40 is similar to a resistor in character, a change in the magneto-resistive read element temperature T results in a change in the resistance R of the magneto-resistive read element 40. This change in the resistance R with flying height 54 is converted into a change in voltage V due to the essentially constant sense current $I_S$ flowing though the magneto-resistive read element 40.

Though this effect occurs at dc (direct current), there is a related ac (alternate current) temperature effect. The air bearing slider 19 on which the head 12 is mounted is able to respond (mechanically) to variations in the disk surface 30 roughness for length scales longer than or equal to the air bearing slider 19 length. At shorter length scales the slider is unable to respond.

There is a modulation of the effective flying height 54 between the magneto-resistive read element 40 and surface 30 of the disk 16, related to the roughness of the surface 30 of the disk 16 as the disk 16 rotates. The roughness has different length scales over which it varies. Dividing the disk rotation velocity by the length scale distance of the roughness provides a spatial frequency. The slider 19 responds to slow variation on the surface 30 of the disk 16 (e.g., length scale or wavelength of about e.g. 1 mm wherein rough spots on the disk surface are 1 mm apart, resulting in a substantially sinusoidal rough variation). If length scale is very large, then there is no spacing (FH) variation between the head 12 and the disk surface 30 because the slider 19 can follow the terrain of the disk surface 30. Roughness of such lengths scales, therefore, does not result in temperature changes in the magneto-resistive read element 40. If the roughness variation is in the very small length scale, e.g. about 1 nm, the slider 19 cannot follow the variation; however, the magneto-resistive read element 40 is unable to respond thermally to such changes in the flying height 54. As such, roughness of such lengths scales does not result in temperature changes in the magneto-resistive read element 40. In between the two extremes of very large and very small length scales, there is a range of length scales for the surface 30 variations, wherein the slider 19 is unable to respond to the surface variation (thus, there is a variation in the flying height 54), but the magneto-resistive read element 40 can respond thermally, thereby providing spatial wavelengths or frequencies of interest. Said frequency range is e.g. about 10–60 kHz. The spatial frequency depends on the radial location of the head 12 on the disk surface 30, because the rotational velocity of the disk surface 30 relative to the head 12 is different at different radial distances from the disk center. For example, in a 95 mm diameter disk, the velocity at inner diameter (ID) of the disk can be e.g. about 10 m/s, and at the outer diameter (OD) about e.g. 20 m/s, at around 5400 rpm. In that case, the spatial frequency is about 10 KHz at the ID, and about 20 KHz at the OD. The thermal voltage (baseline modulation or BLM) in the head readback signal caused by the ac effect, varies at a frequency of 10 KHz or 20 KHz. There may be other frequencies in that signal but using a bandpass filter that passes 10–20 KHz frequency signals, the ac voltage variation is obtained, as described further below.

For an example disk drive 10 with a pico slider 19, the corresponding critical spatial frequency is in the e.g. 10–70 kHz range (depending on the disk spindle speed and the radius). In this frequency range (and at higher frequencies) disk micro-waviness modulates the effective flying height FH 54 between the head 12 and disk surface 30, giving rise to said ac-voltage modulation (BLM) across the magneto-resistive read element 40. At higher spatial frequencies, the baseline modulation is smaller than in the 10–70 kHz range. This is due to the details of the disk roughness distribution (the disk is smoother at shorter wavelengths) and the thermal transfer function of the magneto-resistive read element 40, which is unable to respond thermally at very short time scales; Therefore, the e.g. 10–70 kHz range of spatial frequencies is the optimum region for monitoring BLM.

As described above, in Hybrid or Magneto-Optic recording, a focused laser spot 36 is used to elevate the medium 30 temperature before read/write. For example, medium surface temperatures as large as 300–400 C are predicted during the write process. This elevated medium surface temperature greatly enhances the BLM with respect to what is usually observed in disk drives (where the surface temperature is close to ambient). According to the present invention, the enhanced BLM is used to determine the temperature of the medium 30.

The change in voltage ($V_{THERMAL}$ or BLM voltage) of the magneto-resistive read element 40 due to thermal effects on the read element 40 is predicted to vary as described by the following Relation I below:

$$V_{THERMAL} = I_S \times \Delta R = I_S \times (dR/dT) \times \Delta T \quad \text{(Relation I)}$$

wherein $I_S$ represents sense current, $\Delta R$ represents change in the resistance of the magneto-resistive read element 40 due to temperature change, $\Delta T$ represents the change in temperature of the magneto-resistive read element 40 relative to its surroundings, and $dR/dT$ is the temperature coefficient of the magneto-resistive read element 40 (e.g., for a 40 Ohm GMR sensor this is 0.08 Ohm/C).

Further, $\Delta T$ is a function of: the sense current ($I_S$), the MR element resistance (R), the increase in the disk temperature above ambient ($T_{INC}$), the thermal conductivity of air (Kair), the thermal conductivity of the read gap (Kgap), the flying height or physical spacing (FH) 64 between the MR element and the disk, and the magneto-resistive read element 40 geometry (stripe height, stripe width, stripe thickness and read gap thickness), as shown in Relation 11 below:

$$\Delta T = F(I_S, R, T_{INC}, Kair, Kgap, FH, MR \text{ element geometry}) \quad \text{(Relation II)}$$

Such that for an example magneto-resistive read element 40, a specific quantitative example of the relationship between $\Delta T$ and $T_{INC}$ can be as shown in Relation III below:

$$\Delta T = (2.0666 \times e \times I_S^2 + 0.0568 \times T_{INC}) + (11.27 \times e \times 5 \times I_S^2 - 0.0507 \times T_{INC}| \times \cos(w_o t + phi)) \quad \text{(Relation 111)}$$

wherein in Relation III, the first term ($2.0666 \times e \times I_S^2 + 0.0568 \times T_{INC}$) represents the dc-temperature rise in the magneto-resistive read element 40, and the second term ($|1.27 \times e \times 5 \times I_S^2 - 0.0507 \times T_{INC}| \times \cos(w_o t + phi)$) represents the ac-temperature change in the magneto-resistive read element 40, which gives rise to BLM, and $w_o$ is $2 \times pi$ (e.g., pi is approximately 3.14) times said spatial frequency (corresponding to the microwaviness of the disk surface 30) in the e.g. 10–60 kHz range, and phi is a phase representing the lag between the local disk surface temperature under the head 12 and the thermal response of the magneto-resistive read element 40, with t representing time (for example, for a spatial frequency of 10 KHz, w=2×pi×10 kHz). There can be a distribution of frequencies in this range that give rise to BLM and a distribution of amplitudes for each frequency; in the description herein effect of one frequency is described.

Relation III above is effectively obtained based on a thermal reluctance model of the heat transfer between the disk surface 30 and the magneto-resistive read element 40, including the ballistic heat transport from the disk surface 30 to the magneto-resistive read element 40, and the diffusion of the Joule heating from the magneto-resistive read element 40 into its surroundings. An example derivation of Relation III is shown in Appendix I.

Using a sense current $I_S$ of e.g. 3 mA, and a medium surface temperature $T_{DISK}$ of e.g. 300 C (e.g., $T_{INC}$=280 C), the magnitude of the ac-temperature change in the magneto-resistive read element 40 is 13.1 C at said example spatial frequency between 10–40 kHz. The resulting BLM is 2.7 mVop (before amplification by a read amplifier), which is on the same order as the magnetic recording signals that occur at higher frequencies. A change as small as 20 C in the disk surface temperature $T_{DISK}$ leads to a change in the un-amplified BLM of 0.2 mVop. This signal change can be measured, and disk surface temperature $T_{DISK}$ determined based on the BLM, described hereinbelow.

Figure 7:
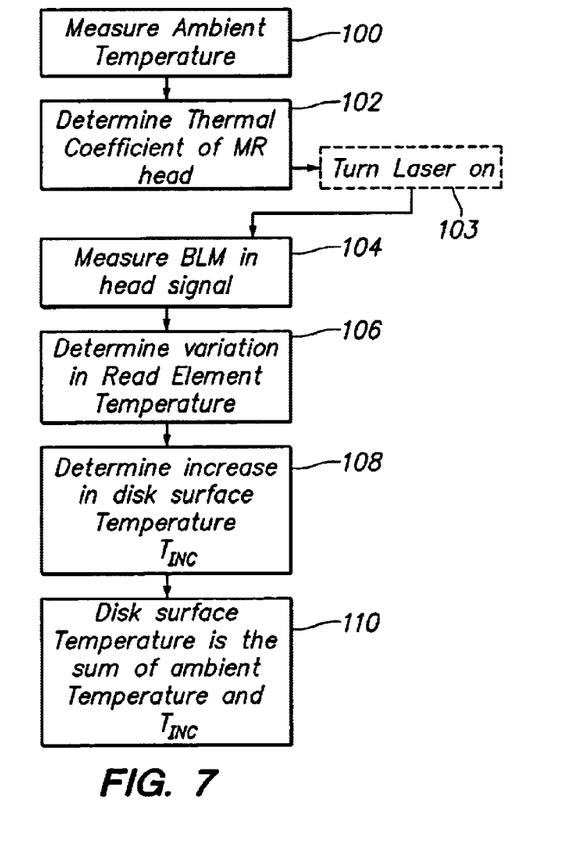
FIG. 7 shows an example of the'steps in determining the surface temperature of the medium according to the present invention.

The surface temperature of the disk $T_{DISK}$ is substantially equal to $T_O + T_{INC}$, wherein $T_O$ is the ambient temperature in the disk drive 10. To determine $T_{DISK}$ for a given disk drive 10 and magneto-resistive read element 40 therein, in an example process according to the present invention, the following steps are performed as shown by example in flowchart of FIG. 7:

(1) Using a separate temperature sensor (e.g., diodes), the ambient temperature $T_O$ is determined (step 100);

(2) The magneto-resistive read element 40 is calibrated to determine dR/dT, wherein the MR thermal coefficient (dR/dT) is calibrated by measuring the change in the head temperature as a function of sense current $I_S$, wherein the head 12 is unloaded and/or the disk not spinning (step 102);

(3) For a sense current $I_S$ and optionally laser 28 turned on (step 103), the BLM voltage ($V_{THERMAL}$) is measured (step 104), and $\Delta T$ is determined using Relation I (step 106), to calculate $T_{INC}$ from example Relation III for the given magneto-resistive read transducer 11 (step 108). For example, with $I_S$=3 mA ($I_S$ usually set by readback requirements of the recorded magnetic signals), the laser power (i.e., $T_{INC}$) is varied, and the dc and/or ac voltage modulation BLM in the magneto-resistive read element 40 are measured. Then, using the measured voltage (BLM), known sense current $I_S$, the dR/dT value, and the Relations I, II and III above, $T_{INC}$ can be determined;

(4) And, the disk surface temperature $T_{DISK}$ is determined as $T_{DISK}=T_O+T_{INC}$ (step 110).

One example method of determining the BLM voltage includes the steps of filtering (band limiting) the head readback signal, amplifying the filtered signal and averaging the filtered signal to improve the signal to noise ratio in the measurement of BLM. Then from Relation I, to determine $\Delta T$, the BLM voltage signal is divided by the sense current $I_S$ to determine the corresponding magneto-resistive read element 40 resistance variation $\Delta R$. And that resistance variation is divided by dR/dT to determine the read element temperature variation, $\Delta T$. Then using Relation III the value $T_{INC}$ can be calculated, wherein disk temperature $T_{DISK}$ is determined as $T_{DISK}=T_O+T_{INC}$.

As shown in the proceeding relations, the baseline modulation BLM associated with the elevated disk temperature during the Hybrid of Magneto-Optic write process is quite large (on the same order as the magnetic recording signals). These BLM signals can be detected using the example electronics 60 shown in FIG. 8. A filter 62 (e.g., notch or bandpass) is used to detect the head signal amplitude at low frequencies (i.e., the spatial frequencies corresponding to the slider length where the baseline modulation is largest). The filter 62 center frequency can be made adjustable for use across the head stroke because the spatial frequency of the peak BLM is a linear function of the radial position.

Figure 8:
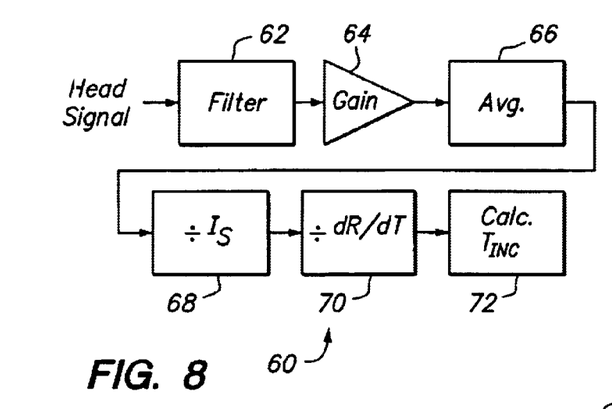
FIG. 8 shows an example block diagram of a circuit for determining the surface temperature of the medium according to the present invention.

The filtered readback signal is amplified by an amplifier 64, wherein the amplifier 64 can comprise e.g. a read amplifier or a separate amplifier. The gain in disk drive amplifiers usually rolls off in the tens of kilo Hertz range, which is the range of frequencies that are of interest for the BLM measurement. However, a narrower bandwidth maybe preferred for improved signal to noise in the measurement.

The amplified signal is then averaged in an averaging block 66. Because the measured voltages are a slowly varying function of time, they can be averaged without information loss to improve the signal to noise ratio in the measurement. In one example, the averaging block 66 can comprise a lowpass filter to reduce noise, as noise is typically in the high frequency range. The averaged BLM voltage signal is divided by the sense current $I_S$ in a first divide block 68 to determine the corresponding magneto-resistive read element 40 resistance variation $\Delta R$. And that resistance variation is divided by dR/dT in a second divide block 70 to determine the magneto-resistive read element 40 temperature variation, $\Delta T$. A calculation block 72 uses Relation III above to calculate $T_{INC}$. And, surface temperature of the disk ($T_{DISK}$) can be determined as $T_{DISK}=T_O+T_{INC}$.

In one example, the above circuit 60 can be implemented in the preamplifier section 18 that injects the sense current through the MR read element 40. There can be two paths for the readback signal, one for normal data path, and another path to the circuit 60 including the narrow-band filter 62. From register settings the sense current value and temperature coefficient dR/dT for that particular magneto-resistive read transducer 11 are known, and based on that information (in an analog or digital circuit 60 in the preamplifier 18) the appropriate band pass filtering (e.g., range of 10 to 60 KHz for filter 62), and divisions that are required are performed, to generate a signal that represents the temperature variation $\Delta T$ of the magneto-resistive read element 40, generated as the output of the block 70. Then the $\Delta T$ value can be used in the calculation block 72, such as in the disk drive controller 24 or ASIC 26, that implements Relation III to determine $T_{INC}$, and disk temperature $T_{DISK}$, as described.

The above Relations can be used to determine $T_{INC}$ from $\Delta T$, and then $T_{DISK}=T_O+T_{INC}$. In another version of the present invention, a calibration look-up table can be used instead. In that case, at manufacturing the laser power is varied, the disk surface temperature $T_{DISK}$ is measured, creating a look-up table. In the look-up table, each laser power corresponds to a surface temperature that corresponds to a change in the ac temperature of the magneto-resistive read element 40. The calibration/measurement procedure is performed e.g. when the In another look-up table method, the goal is to determine the correct write width and read width 50, 52, for an appropriate laser power. To create that look-up table at e.g. manufacturing time, the laser power is varied, $\Delta T$ is measured for each laser power setting using the circuit 60, and the write width 50 and read width 52 are obtained for each laser power setting and corresponding $\Delta T$. Later, when using the disk drive 10, the write widths and read widths need not be measured, by knowing a $\Delta T$ measurement from the circuit 60. If a different value of $\Delta T$ is measured than expected for a laser power setting in the look-up table that may mean the laser power has drifted, and the laser must be adjusted to obtain the correct write width and read widths.

As such, the ac variation in the resistance of the magneto-resistive read element 40 can be used as a means for determining the recording performance and an appropriate laser power setting for desired recording performance. One way is taking the intermediate step of determining $T_{INC}$ either experimentally, or theoretically. Alternatively, another way is to skip the intermediate step of calculating $T_{INC}$, and determine the recording performance using $\Delta T$ as a simple metric that can be determined with the circuit 60 in real-time. Therefore, using the $\Delta T$ measurement, the present invention allows adjusting the laser power in real-time using the $\Delta T$ and e.g. look-up table.

Figure 9:
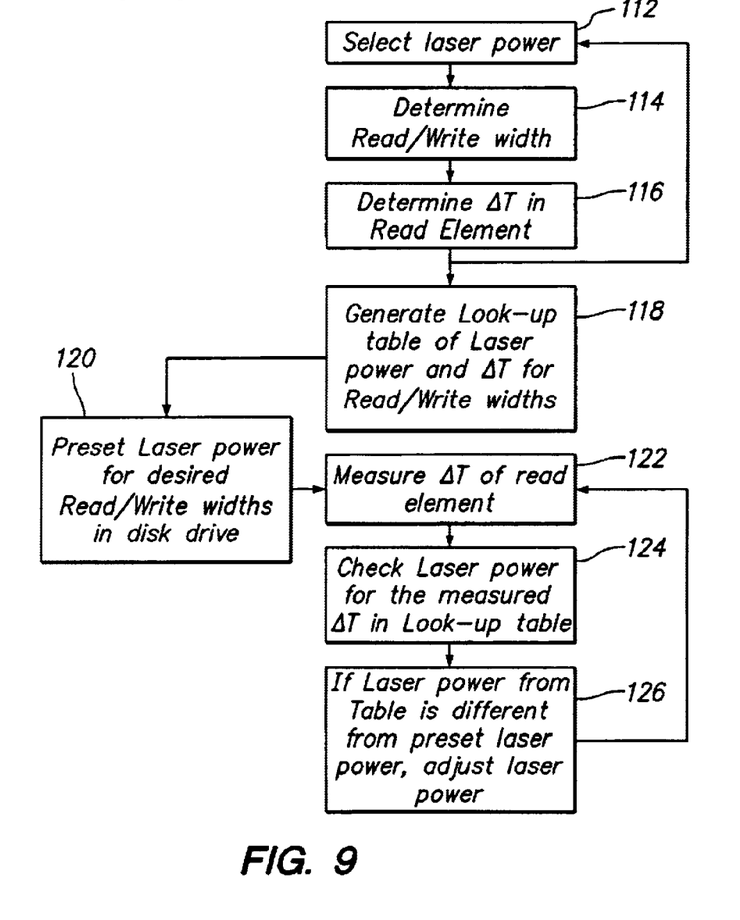
FIG. 9 shows an example of the steps in determining the recording performance based measurement of head temperature variations according to the present invention.

It is desirable to ensure a desired recording performance, under a variety of conditions as the disk drive ages, as the environment changes, etc. And, according to the present invention, a method of using the ac variation in the resistance of the magneto-resistive read element 40 and corresponding BLM voltage, provides feedback as to recording performance that is ultimately related to the temperature of the disk surface. Referring to example steps in flowchart of FIG. 9, in one example, a look-up table is generated using an empirical method, wherein for each selected laser power setting (step 112) a measure of recording performance is obtained (e.g., read width and write width) as a function of laser power (step 114) and the corresponding $\Delta T$ is determined with circuit 60 (step 116). The different values of laser power, recording performance and corresponding $\Delta T$ are stored in a look-up table in the disk drive (step 118). The proper laser power for a desired recording performance is then preset in the disk drive (step 120). Thereafter, in use, $\Delta T$ is measured using circuit 60 (step 122), and the corresponding laser power is looked up in the look-up table (step 124). If the looked up laser power is different than the expected laser power setting in the disk drive, then there may be a loss of recording performance, and appropriate actions taken (step 126) such as adjusting the laser power as necessary to regain the loss of recording performance.

In different implementations of the present invention, the effects of velocity and skew on $\Delta T$ can be taken into consideration, wherein the former is only important during the disk spin up, and the latter can be calibrated by measuring $\Delta T$ across the disk stroke with $T_{DISK}=T_O$ (i.e., with the laser turned off). Further, the detection technique described here is one example. Other examples according to the present invention are possible, such as using lock-in detectors (phase correlated detectors that have extremely narrow band filters) for the range of spatial frequencies of interest.

If the variation of the thermal conductivity of air with humidity (a secondary effect) limits the accuracy of the $T_{INC}$ estimates, an additional humidity sensor (a type of strain gauge) can also be incorporated into the disk drive. Using the known variation in the thermal conductivity of air with humidity, a correction to the $T_{INC}$ calculation can be made ($T_{INC}$ is a function of the thermal conductivity of air as shown in Relation II).

The measured surface temperature according to the present invention, can be used in conjunction with information about the variation in the temperature through the medium structure and/or the dependence of the medium surface temperature on the spot size, to control the spot size/thermal contour using the laser power (as opposed to using expensive laser and/or optical components), to provide feedback on the required laser power as a function of ambient condition, and to provide a means for calibrating the required laser power as the laser ages. In addition, the temperature measurement/detection technique is simple (compared to other techniques such as using the ratio of the Stokes/Anti-stokes intensity of a particular Raman mode associated with the overcoat or optical pyrometry) and is insensitive to surface contamination and environmental conditions, wherein provisions for correcting for changes in the ambient temperature and/or humidity are provided in the detection method herein.

The present invention has been described in considerable detail with reference to certain preferred versions thereof; however, other versions are possible. Therefore, the spirit and scope of the appended claims should not be limited to the description of the preferred versions contained herein.

Appendix I—A Technique for Measuring the Surface Temperature of a Disk When Irradiated by a Laser Summary: Closed form expressions for the dc-temperature and baseline modulation of an MR sensor are developed. These expressions are extended to include the effects of laser heating of the disk surface (Hybrid writing or reading). The feasibility of using this effect to determine the disk surface temperature during the write process (for purposes of calibrating the laser power) is demonstrated. In addition, estimates for the low-frequency noise associated with such thermal effects in the read process are provided.

Details: This technique uses the GMR sensor base line modulation.

The output of an MR sensor (AMR or GMR) can be expressed as $$V = V_{MAGNETIC} + V_{THERMAL}.$$

In this context the magnetic signals are not of interest. The thermal signal is due to the joule heating of the sensor by the sense current ($I_S$) and the ballistic heat transport between the sensor and the disk surface. The latter is driven by the gradient between the MR sensor and the disk surface. The thermal signal can be expressed as $$V_{THERMAL} = I_S \Delta R = I_S \frac{dR}{dT} \Delta T,$$

where $I_S$ is the sense current, $\Delta R$ is the change in the sensor resistance, $dR/dT$ is the temperature coefficient of the sensor (0.16%/C for GMR heads), and $\Delta T$ is the change in the sensor temperature. $\Delta T$ can be estimated by detailed balance at equilibrium (conservation of heat flowing into and out of the read sensor). Wherein:

$$\sum F \cdot A = \frac{2k_{GAP}[T_{HEAD} - T_0](1-\alpha) \cdot WH}{g} + \frac{k_{AIR}[T_{HEAD} - T_{DISK}] \cdot Wt}{FH} = I_S^2 R,$$

where F is the heat flux, A is an area, $k_{GAP}$ is the read gap thermal conductivity, $T_{HEAD}$ is the head temperature, $T_o$ is ambient temperature, the factor of $1-\alpha$ accounts for the fact that the shield temperature is higher than ambient (estimates place $\alpha$ at 0.1), W is the read width, H is the stripe height, g is the read gap, $k_{AIR}$ is the thermal conductivity of air, $T_{DISK}$ is the disk temperature, t is the stripe thickness, FH is the flying height, and R is the stripe resistance. The first term is associated with heat transfer to the shields; the second approximates the heat transfer to the disk in the ballistic heat transfer regime (i.e. when the FH is less than the mean free path of air, which is around 100 nm or 4 μin); heat transfer via the leads and the top surface of the MR sensor are ignored.

Case 1) When the laser is off, $T_{DISK} = T_o$ (this corresponds to the normal HDD condition). Defining $\Delta T = T_{HEAD} - T_o$ and rearranging, $$\Delta T \left( \frac{2k_{GAP}(1-\alpha)WH}{g} + \frac{k_{AIR}Wt}{FH} \right) = I_S^2 R$$

$$\Delta T \left( \frac{2k_{GAP}(1-\alpha)WH \cdot FH + k_{AIR}Wtg}{gFH} \right) = I_S^2 R$$

$$\Delta T = I_S^2 R \left( \frac{gFH}{2k_{GAP}(1-\alpha)WH \cdot FH + k_{AIR}Wtg} \right)$$

$$\Delta T = I_S^2 R \left[ \frac{gFH}{(2k_{GAP}(1-\alpha)WH \cdot FH)} \right] \frac{1}{\left(1 + \frac{k_{AIR}Wtg}{2k_{GAP}(1-\alpha)WH \cdot FH}\right)}.$$

Since $k_{AIR}/k_{GAP} \ll 1$, the last term in this expression has the form $(1+x)^-$ where $x \ll 1$. Using the binomial expansion theorem, $$(1+x)^n \approx 1 + nx,$$

we have $$\Delta T = I_S^2 R \frac{g}{2k_{GAP}(1-\alpha)WH} \left[ 1 - \frac{k_{AIR}tg}{2k_{GAP}(1-\alpha)H \cdot FH} \right].$$

The first (dominant) term predicts a temperature rise above ambient of 55 C for a Corona+ head (with $\alpha = 0.1$ and $k_{GAP} = 1.01$ W/mK, which corresponds to $Al_2O_3$), in reasonable agreement with experimental values. (Other input parameters for Corona+ are R=40Ω, g=90 nm, W=0.9 μm, t=30 nm, FH=33 nm, H=1 μm, $I_S$=5 mA). The second term predicts an additional temperature decrease of 0.074 C for Corona+ (with $k_{AIR}$=0.03 W/mK). Experimentally, values of 3.3 C are found for this term. The second term is underestimated because there is also heat transfer from the shields and gaps to the disk (i.e. the effective area for heat transfer is significantly larger than the stripe thickness times the stripe width) and there are additional air bearing effects that are neglected in this analysis. A fudge factor f (equal to 45) can be incorporated in the simple expression to account for the discrepancy. The predicted variation of $\Delta T$ (including the fudge factor f) with $I_S$ is shown in Table I.

TABLE I

The predicted increase in the head temperature (at dc) as a function of the sense current with the laser turned off.

| $I_S$ (mA) | $\Delta T$ (C.) |
|---|---|
| 1 | 2.07 |
| 2 | 8.27 |
| 3 | 18.60 |
| 4 | 33.06 |
| 5 | 51.66 |
| 6 | 74.40 |
| 7 | 101.26 |

Case 2) Long wavelength modulation of the flying height (for example, runout) and/or the disk surface texture (microwaviness) give rise to a modulation in the second term. Substituting, $$FH = \overline{FH}[1 + \beta \cos(\omega_o t)],$$

where β is the modulation in the surface roughness and $\omega_o$ is the corresponding spatial frequency. Thus, $$\Delta T = I_S^2 R \frac{g}{2k_{GAP}(1-\alpha)WH} \left[1 - \frac{k_{AIR}tgf}{2k_{GAP}(1-\alpha)H \cdot FH(1+\beta\cos(w_o t))}\right].$$

Assuming $\beta \ll 1$, we can use the binomial expansion theorem again and $$\Delta T = I_S^2 R \frac{g}{2k_{GAP}(1-\alpha)WH} \left[1 - \frac{k_{AIR}tgf}{2k_{GAP}(1-\alpha)H \cdot FH} + \frac{k_{AIR}tgf}{2k_{GAP}(1-\alpha)H \cdot FH}\beta\cos(w_o t)\right].$$

The first two terms in the brackets are the dc-temperature change; the last is the ac-modulation term. In practice, there is a distribution of $\beta$ and $\omega_o$ values. In this example focus is on a particular component. The wavelengths of importance (where the MR sensor is able to respond to the thermal changes) are large, on the order of the slider size (there is no FH modulation on longer length scales because the slider is able to follow such features; the transient thermal response of the MR sensor is insufficient to respond to FH modulation at very small length scales). The corresponding spatial frequencies are estimated to be in the 10–60 kHz range (depending on the spindle velocity). Reasonable agreement with experimental values for $\Delta T$ (3.18 C) are obtained for $\beta=0.95$. In this analysis $V_{THERMAL}$ associated with $\Delta T$ goes as $I_S^3$. Measured values of the exponent vary between 2.5–3.5.

Case 3) For hybrid recording $T_{DISK}$ is not equal to $T_o$. In fact, $T_{DISK}$ is proportional to the laser power P. Substituting $T_{DISK}=T_O+T_{INC}$ and repeating the calculation (including the FH modulation) we find $$\Delta T = \left[I_S^2 R + \frac{k_{AIR}T_{INC}Wtf}{FH}(1-\beta\cos(w_o t))\right] \cdot \frac{g}{2k_{GAP}(1-\alpha)WH} \left[1 - \frac{k_{AIR}tgf}{2k_{GAP}(1-\alpha)H \cdot FH} + \ldots \frac{k_{AIR}tgf}{2k_{GAP}(1-\alpha)H \cdot FH}\beta\cos(w_o t)\right].$$

Rearranging and keeping only lowest order terms in $\beta$, we have $$\Delta T = \left[I_S^2 R + \frac{k_{AIR}T_{INC}Wtf}{FH}\right] \cdot \frac{g}{2k_{GAP}(1-\alpha)WH} \left[1 - \frac{k_{AIR}tgf}{2k_{GAP}(1-\alpha)H \cdot FH} + \frac{k_{AIR}tgf}{2k_{GAP}(1-\alpha)H \cdot FH}\beta\cos(w_o t)\right] - \ldots \left[\frac{k_{AIR}T_{INC}Wtf}{FH}\beta\cos(w_o t)\right] \cdot \frac{g}{2k_{GAP}(1-\alpha)WH}\left[1 - \frac{k_{AIR}tgf}{2k_{GAP}(1-\alpha)H \cdot FH}\right].$$

Rearranging again, we have, $$\Delta T = \left[I_S^2 R + \frac{k_{AIR}T_{INC}Wtf}{FH}\right] \cdot \frac{g}{2k_{GAP}(1-\alpha)WH} \left[1 - \frac{k_{AIR}tgf}{2k_{GAP}(1-\alpha)H \cdot FH}\right] + \ldots \left[I_S^2 R + \frac{k_{AIR}T_{INC}Wtf}{FH}\right] \cdot \beta\cos(w_o t) \cdot \frac{g}{2k_{GAP}(1-\alpha)WH} \cdot \left[\frac{k_{AIR}tgf}{2k_{GAP}(1-\alpha)H \cdot FH}\right] - \ldots \left[\frac{k_{AIR}T_{INC}Wtf}{FH}\beta\cos(w_o t)\right] \cdot \frac{g}{2k_{GAP}(1-\alpha)WH}\left[1 - \frac{k_{AIR}tgf}{2k_{GAP}(1-\alpha)H \cdot FH}\right].$$

Finally, we have $$\Delta T = \left[I_S^2 R + \frac{k_{AIR}T_{INC}Wtf}{FH}\right] \cdot \frac{g}{2k_{GAP}(1-\alpha)WH} \left[1 - \frac{k_{AIR}tgf}{2k_{GAP}(1-\alpha)H \cdot FH}\right] + \ldots \beta\cos(w_o t) \cdot \frac{g}{2k_{GAP}(1-\alpha)WH} \cdot \left[I_S^2 R \frac{k_{AIR}tgf}{2k_{GAP}(1-\alpha)H \cdot FH} + \frac{k_{AIR}T_{INC}Wtf}{FH} \cdot \left(\frac{k_{AIR}tgf}{k_{GAP}(1-\alpha)H \cdot FH} - 1\right)\right].$$

Thus, a simple expression appropriate for Corona+ is $$\Delta T = [2.0665e6 I_S^2 + 0.0570 T_{INC}] + [1.27e5 I_S^2 - 0.0507 T_{INC}]\cos(w_o t).$$

The first term is the dc-temperature change; the second term is the ac-modulation. Using this effect to determine $\Delta T$ during the write process, we set $I_S=3$ mA (a reasonable value that maximizes the sensitivity to the modulation while preventing thermal run away or electromigration problems). With $T_{DISK}=250$ C, $T_o=20$ C, and thus $T_{INC}=230$, the dc-temperature of the head is estimated to be 31.7 C above ambient. The magnitude of the ac-modulation is estimated to be 10.5 C or 3.3× larger than in Case 2 above (and with opposite phase). The dependence of the dc-temperature change and the magnitude of the ac-temperature modulation on $T_{INC}$ (with $I_S=3$ mA and $T_o=20$ C) is given in Table II.

TABLE II

The dependence of the dc-temperature change and ac-temperature modulation on $T_{INC}$ (with $I_S = 3$ mA and $T_o = 20$ C).

| $T_{INC}$ (C.) | Dc-Temperature Change (C.) | Ac-Temperature Modulation (C.) |
|---|---|---|
| 100 | 23.16 | 2.91 |
| 125 | 24.58 | 4.18 |
| 150 | 26.01 | 5.45 |
| 175 | 27.43 | 6.72 |
| 200 | 28.86 | 7.98 |
| 225 | 30.28 | 9.25 |
| 250 | 31.71 | 10.52 |
| 275 | 33.13 | 11.79 |
| 300 | 34.56 | 13.05 |

(Note: We can also use this expression to study the thermal effects (notably noise) in the read process. Setting $I_S=5$ mA, with $T_{DISK}=150$ C, $T_O=20$ C, and thus $T_{INC}=130$ C, the dc-temperature of the head is estimated to be 59.1 C above ambient, or 7.4 C higher than predicted in Case 1 above. The magnitude of the ac-modulation is estimated to be 3.4 C or 1.1× larger than in Case 2 above (and with opposite phase). The competition between the ac-modulation terms associated with cooling to the disk and heating from the disk does suggest an obvious null point where the modulation is zero. In this analysis, this is predicted to occur for $T_{INC}=62.6$ C, which, within the approximations in the calculation, is close to where $\Delta T$ between the head and disk equals zero. Alternatively, coding could be used to limit long wavelength data patterns, thereby minimizing the effect of the ac-modulation on the data detection process.)

Surface Temperature Estimation

Optimal Hybrid recording at high density may require an independent technique for determining the laser power. For example, simply adjusting the laser power and measuring the on-track recording performance may result in a degradation of the off-track performance due to excessive thermal diffusion towards neighboring tracks. While a more sophisticated laser power optimization procedure that includes both on-track and off-track performance is possible, a procedure that set the laser power such that the disk was heated to the desired temperature (based on the medium magnetic properties) could be advantageous. Knowledge of the disk temperature could also be used to help minimize effects such as LAPD.

The effects described in this work can be used to determine the surface temperature of a disk. Given the size of the thermal coefficient for GMR sensors, either the dc- or ac-effects can be readily measured during the write process (the first calculation in Case 3), though the ac-modulation might prove easier with a narrow band filter at the spatial frequency corresponding to the slider length.

A procedure for using the baseline modulation to determine $T_{DISK}$ could include the following steps Use a separate sensor to measure the ambient temperature $T_{DISK}$ in a drive.

If the variation of $k_{AIR}$ with humidity (a secondary effect) limits the accuracy of the $T_{DISK}$ estimates, an additional humidity sensor (a type of strain gauge) can also be incorporated into the drive.

Calibrate the MR thermal coefficient (dR/dT) with the head unloaded and/or the disk not spinning by measuring the change in the head temperature as a function of $I_S$.

With $I_S$=3 mA, vary the laser power (i.e. $T_{DISK}$). Measure the dc- or ac-voltage modulation in the MR sensor. With the voltage, known sense current, the dR/dT value, and the formalism out lined here, $T_{INC}$ can be determined.

$T_{DISK}$, the surface temperature of the disk, is $T_o+T_{INC}$.

The effects of velocity and skew on ΔT can be considered. The former is only important during the disk spin up. The latter can have a complicated dependence but can be calibrated by measuring ΔT across the disk stroke with $T_{DISK}$=$T_o$(i.e. with the laser turned off).

What is claimed is:

1. In a data storage device having a storage media and a transducer head for writing data to, and reading data from, at least a surface of the storage media, the temperature of the transducer head and electrical resistance thereof varying as a function of media surface temperature change, a readback signal having a baseline modulation (BLM) as a result of electrical resistance variation of the transducer head, the storage device further including a laser system for heating the media for read and/or write operations with the transducer head, a method for determining the temperature of the media, comprising the steps of:
(a) heating the media with the laser system;
(b) obtaining a readback signal from the transducer head including said base line modulation;
(c) detecting the baseline modulation from the readback signal; and
(d) determining the temperature of the media as a function of the baseline modulation.

2. The method of claim 1, wherein:
step (c) further includes the steps of measuring the ambient temperature; and
step (d) further includes the steps of determining the temperature of the media as a function of said ambient temperature and the baseline modulation.

3. The method of claim 1, wherein step (a) further includes the steps of heating the media with the later system to enhance the base line modulation in the readback signal.

4. The method of claim 1, wherein in step (c) detecting the base line modulation further includes the steps of:

passing the readback signal through a band pass filter at selected frequencies to detect the BLM signal.

5. The method of claim 4, wherein:
step (c) further includes the steps of:
amplifying the detected BLM signal;
averaging the BLM signal; and
step (d) further includes the steps of determining the temperature of the media as a function of said averaged BLM signal.

6. The method of claim 4, wherein said band pass filter frequencies are selected to detect signal amplitude essentially where the base line modulation is largest.

7. The method of claim 1, wherein the head includes a read element for obtaining said readback signal, such that the variation in head resistance (ΔR) is associated with a change in voltage due to a sense current ($I_S$) flowing through the read element, wherein the base line modulation represents modulation in said voltage.

8. The method of claim 7, wherein step (d) further includes the steps of:
determining a change in the temperature of the media ($T_{INC}$) relative to ambient, as a function of the voltage modulation; and
determining the temperature of the media as a function of said change in the temperature of the media.

9. The method of claim 8, wherein the step of determining a change in temperature of the media ($T_{INC}$), further includes the steps of:
determining a change in the temperature of the head (ΔT) relative to ambient as a function of the voltage modulation and the sense current ($I_S$); and
determining the change in the temperature of the media ($T_{INC}$) as a function of the change in the temperature of the head (ΔT).

10. The method of claim 7, wherein step (d) further includes the steps of:
determining a change in the temperature of the head (ΔT) relative to ambient as a function of the voltage modulation and the sense current ($I_S$); and
determining the temperature of the media as a function of said change in the temperature of the head (ΔT).

11. The method of claim 10, further comprising the steps of:
(e) adjusting the laser power based on the temperature of the head to control recording and/or playback efficiency of data on the media with the head.

12. The method of claim 1, further comprising the steps of:
(e) adjusting the laser power based on the determined temperature of the media to control recording and/or playback efficiency of data on the media with the head.

13. The method of claim 1, further comprising the steps of:
(e) adjusting the laser power based on the determined temperature of the media to control data recording and/or playback parameters on the media.

14. The method of claim 13, wherein step (e) further includes the steps of:
adjusting the laser power based on the determined temperature of the media to control read width and/or write width of the head on the media.

15. The method of claim 13, further comprising the steps of:
adjusting the laser power based on the determined temperature of the media to control data recording density on the media with the head.

16. The method of claim 1, further comprising the steps of:

(f) adjusting the laser power based on the determined temperature of the media to control the thermal profile of the media surface under the head, thereby controlling recording and/or playback parameters for data on the media with the head.

17. A method for controlling data recording/playback performance of a data storage device having a storage media and a transducer head for writing data to, and reading data from, at least a surface of the storage media, the temperature of the transducer head and electrical resistance thereof varying as a function of media surface temperature change, the transducer head generating a readback signal having a baseline modulation (BLM) as a result of electrical resistance variation of the transducer head, the data storage device further including a laser system for heating the media for read and/or write operations with the transducer head, the method comprising the steps of:

in a calibration mode:
(a) determining recording/playback performance of the head on the media as a function of different laser power and corresponding head temperatures;
(b) setting the laser power for, a selected recording/playback performance;

in an operational feedback mode:
(c) obtaining a readback signal from the head including said base line modulation;
(d) detecting the baseline modulation from the readback signal;
(e) determining the temperature of the head as a function of the baseline modulation;
(f) looking-up the expected laser power corresponding to the determined head temperature, from the performance information of step (a); and
(g) if the expected laser power is essentially different than the laser power setting in step (b), indicating deviation from the selected recording/playback performance, then adjusting the laser power setting to regain the selected recording/playback performance.

18. The method of claim 17, wherein in step (d) detecting the base line modulation further includes the steps of:
passing the readback signal through a band pass filter at selected frequencies to detect the BLM signal.

19. The method of claim 18, wherein:
step (d) further includes the steps of:
amplifying the detected BLM signal;
averaging the BLM signal; and
step (e) further includes the steps of determining the temperature of the head as a function of said averaged BLM signal.

20. The method of claim 18, wherein said band pass filter frequencies are selected to detect signal amplitude essentially where the base line modulation is largest.

21. The method of claim 17, wherein the head includes a read element for obtaining said readback signal, such that the variation in head resistance ($\Delta R$) is associated with a change in voltage due to a sense current ($I_S$) flowing through the read element, wherein the base line modulation represents modulation in said voltage.

22. The method of claim 21, wherein step (e) further includes the steps of:
determining a change in the temperature of the head ($\Delta T$) relative to ambient as a function of the voltage modulation and the sense current ($I_S$); and determining the temperature of the head as a function of said change in the temperature of the head ($\Delta T$).

23. The method of claim 17, wherein in step (g) adjusting the laser power further includes the steps of:
adjusting the laser power to control the thermal profile of the media surface under the head, thereby controlling recording and/or playback parameters for data on the media with the head.

24. The method of claim 17, wherein the selected performance comprises selected read width and/or write width of the head on the media.

25. The method of claim 17, wherein the selected performance comprises selected data recording density on the media with the head.

26. A data storage device, comprising:
data storage media;
a transducer head for writing data to and/or reading data from at least a surface of the media, wherein the temperature of the transducer head and electrical resistance thereof vary as a function of media surface temperature change, such that the head generates a readback signal having a baseline modulation (BLM) as a result of electrical resistance variation of the transducer head;
a laser system for heating the media for read and/or write operations; and
a detector that detects the baseline modulation from the readback signal, and determines the temperature of the head as a function of the baseline modulation to select laser power to control media thermal profile and corresponding data recording/playback performance on the media with the head.

27. The data storage device of claim 26, wherein the detector further comprises:
a band pass filter for passing the readback signal through at selected frequencies to detect the BLM signal.

28. The data storage device of claim 27, wherein the detector further comprises:
an amplifier that amplifies the detected BLM signal; and
averaging logic that averages the BLM signal;
wherein the detector determines the head temperature as a function of said averaged BLM signal.

29. The data storage device of claim 27, wherein said band pass filter frequencies are selected to detect signal amplitude essentially where the base line modulation is largest.

30. The data storage device of claim 26, wherein the head includes a read element for obtaining said readback signal, such that the variation in head resistance ($\Delta R$) is associated with a change in voltage due to a sense current ($I_S$) flowing through the read element, wherein the base line modulation represents modulation in said voltage.

31. The data storage device of claim 30, wherein the detector further determines a change in the temperature of the head ($\Delta T$) relative to ambient as a function of the voltage modulation and the sense current ($I_S$), and determines the temperature of the head as a function of said change in the temperature of the head ($\Delta T$).

32. The data storage device of claim 26, further comprising:
a controller that selects the laser power based on the determined head temperature, for a desired recording/playback performance.

33. The data storage device of claim 26, further comprising:
   performance information stored in memory, the performance information including recording/playback performance of the head on the media as a function of different laser power and corresponding head temperatures, such that the laser power is set for a selected recording/playback performance;
   a controller that uses the performance information to looks-up the expected laser power corresponding to the head temperature determined by the detector, and if the expected laser power is essentially different than said laser power setting, indicating deviation from the selected recording/playback performance, the controller adjusts the laser power setting to regain the selected recording/playback performance.

34. The data storage device of claim 26, further including a controller responsive to the detector, wherein the controller adjusts the laser power based on the detected head temperature to control the thermal profile of the media surface under the head, thereby controlling data recording and/or playback parameters on the media with the head.

35. The data storage device of claim 26, wherein the recording/playback performance comprises selected read width and/or write width of the head on the media.

36. The data storage device of claim 26, wherein the selected performance comprises selected data recording density on the media with the head.

37. The data storage device of claim 26, wherein the detector further determines the temperature of the media as a function of the baseline modulation, and the data storage device further includes a controller that selects laser power based on the temperature of the media detected by the detector, to control media thermal profile and corresponding data recording/playback performance on the media with the head.

38. The data storage device of claim 37, wherein the head includes a read element for obtaining said readback signal, such that the variation in head resistance ($\Delta R$) is associated with a change in voltage due to a sense current ($I_S$) flowing through the read element, wherein the base line modulation represents modulation in said voltage.

39. The data storage device of claim 38, wherein the detector further detects a change in the temperature of the media ($T_{INC}$) relative to ambient, as a function of the voltage modulation, and determines the temperature of the media as a function of said change in the temperature of the media.

40. The data storage device of claim 39, wherein the detector detects the change in temperature of the media ($T_{INC}$) by determining a change in the temperature of the head ($\Delta T$) relative to ambient as a function of the voltage modulation and the sense current ($I_S$), and determines the change in the temperature of the media ($T_{INC}$) as a function of the change in the temperature of the head ($\Delta T$).

41. A regulator for a data storage device having a data storage media and a transducer head for writing data to and/or reading data from at least a surface of the media, wherein the temperature of the transducer head and electrical resistance thereof vary as a function of media surface temperature change, such that the head generates a readback signal having a baseline modulation (BLM) as a result of electrical resistance variation of the transducer head, the data storage device further including a laser system for heating the media for read and/or write operations, the regulator comprising:
   a detector that detects the baseline modulation from the readback signal, and determines the temperature of the head as a function of the baseline modulation to select laser power to control media thermal profile and corresponding data recording/playback performance on the media with the head.

42. The regulator of claim 41, wherein the detector further comprises:
   a band pass filter for passing the readback signal through at selected frequencies to detect the BLM signal.

43. The regulator of claim 42, wherein the detector further comprises:
   an amplifier that amplifies the detected BLM signal; and
   averaging logic that averages the BLM signal;
   wherein the detector determines the head temperature as a function of said averaged BLM signal.

44. The regulator of claim 42, wherein said band pass filter frequencies are selected to detect signal amplitude essentially where the base line modulation is largest.

45. The regulator of claim 41, wherein the head includes a read element for obtaining said readback signal, such that the variation in head resistance ($\Delta R$) is associated with a change in voltage due to a sense current ($I_S$) flowing through the read element, wherein the base line modulation represents modulation in said voltage.

46. The regulator of claim 45, wherein the detector further determines a change in the temperature of the head ($\Delta T$) relative to ambient as a function of the voltage modulation and the sense current ($I_S$), and determines the temperature of the head as a function of said change in the temperature of the head ($\Delta T$).

47. The regulator of claim 41, further comprising:
   a controller that selects the laser power based on the determined head temperature, for a desired recording/playback performance.

48. The regulator of claim 41, wherein:
   the storage device further includes performance information stored in memory, the performance information including recording/playback performance of the head on the media as a function of different laser power and corresponding head temperatures, such that the laser power is set for a selected recording/playback performance;
   the regulator further includes a controller that uses the performance information to looks-up the expected laser power corresponding to the head temperature determined by the detector, and if the expected laser power is essentially different than said laser power setting, indicating deviation from the selected recording/playback performance, the controller adjusts the laser power setting to regain the selected recording/playback performance.

49. The regulator of claim 41, further including a controller responsive to the detector, wherein the controller adjusts the laser power based on the detected head temperature to control the thermal profile of the media surface under the head, thereby controlling data recording and/or playback parameters on the media with the head.

50. The regulator of claim 41, wherein the recording/playback performance comprises selected read width and/or write width of the head on the media.

51. The regulator of claim 41, wherein the selected performance comprises selected data recording density on the media with the head.

52. The regulator of claim 41, wherein the detector further determines the temperature of the media as a function of the baseline modulation, and the regulator further includes a controller that selects laser power based on the temperature of the media detected by the detector, to control media thermal profile and corresponding data recording/playback performance on the media with the head.

53. The regulator of claim 52, wherein the head includes a read element for obtaining said readback signal, such that the variation in head resistance ($\Delta R$) is associated with a change in voltage due to a sense current ($I_S$) flowing through the read element, wherein the base line modulation represents modulation in said voltage.

54. The regulator of claim 53, wherein the detector further detects a change in the temperature of the media ($T_{INC}$) relative to ambient, as a function of the voltage modulation, and determines the temperature of the media as a function of said change in the temperature of the media.

55. The regulator of claim 54, wherein the detector detects the change in temperature of the media ($T_{INC}$) by determining a change in the temperature of the head ($\Delta T$) relative to ambient as a function of the voltage modulation and the sense current ($I_S$), and determines the change in the temperature of the media ($T_{INC}$) as a function of the change in the temperature of the head ($\Delta T$).

* * * * *